United States Patent

[11] 3,580,220

| [72] | Inventors | Allen D. Cook<br>Philadelphia;<br>Kalman T. Szabo, Ambler, Pa. |
|---|---|---|
| [21] | Appl. No. | 851,678 |
| [22] | Filed | Aug. 20, 1969 |
| [45] | Patented | May 25, 1971 |
| [73] | Assignee | Smith, Kline & French Laboratories<br>Philadelphia, Pa. |

[54] SMALL ANIMAL-MILKING APPARATUS
10 Claims, 11 Drawing Figs.

[52] U.S. Cl. .................................................. 119/14.01,
119/99, 119/103, 119/14.54
[51] Int. Cl. ..................................................... A01j 03/00,
A01j 05/00
[50] Field of Search .......................................... 119/103,
27, 14.01, 14.02, 14.03, 96, 98, 14.54, 14.39

[56] References Cited
UNITED STATES PATENTS

| 1,788,924 | 1/1931 | Marrinan et al. | 119/103 |
| 2,680,452 | 6/1954 | Merritt et al. | 119/14.54X |
| 2,709,416 | 5/1955 | Thomas | 119/14.54 |
| 2,737,153 | 3/1956 | Dupont et al. | 119/103 |
| 3,023,734 | 3/1962 | Schaub | 119/99 |
| 3,103,204 | 9/1963 | Greene | 119/103 |
| 3,150,637 | 9/1964 | Fosnes | 119/14.54 |
| 3,448,725 | 6/1969 | Holm et al. | 119/27 |

*Primary Examiner*—Aldrich F. Medbery
*Attorney*—Busser, Smith & Harding

ABSTRACT: A milking machine for rats or the like having a cage for holding the rat in a suckling position with its teats exposed and means for applying a suction to a plurality of cups which are adapted to receive teats or nipples of the rat. A valve means controls the application of suction to any desired number of cups and the suction is controlled to be provided intermittently by means of a pulsator.

INVENTORS
KALMAN T. SZABO
& ALLEN D. COOK

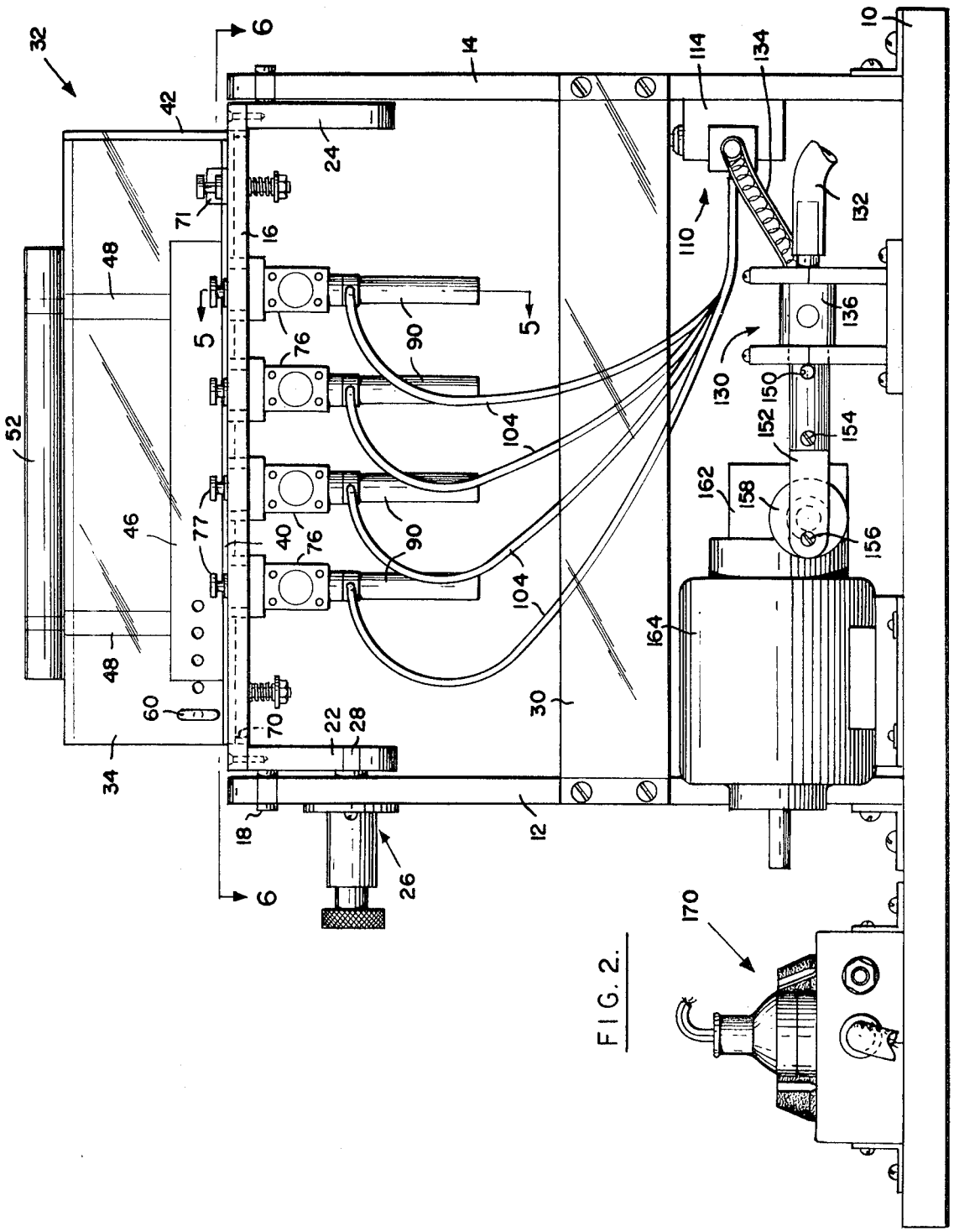

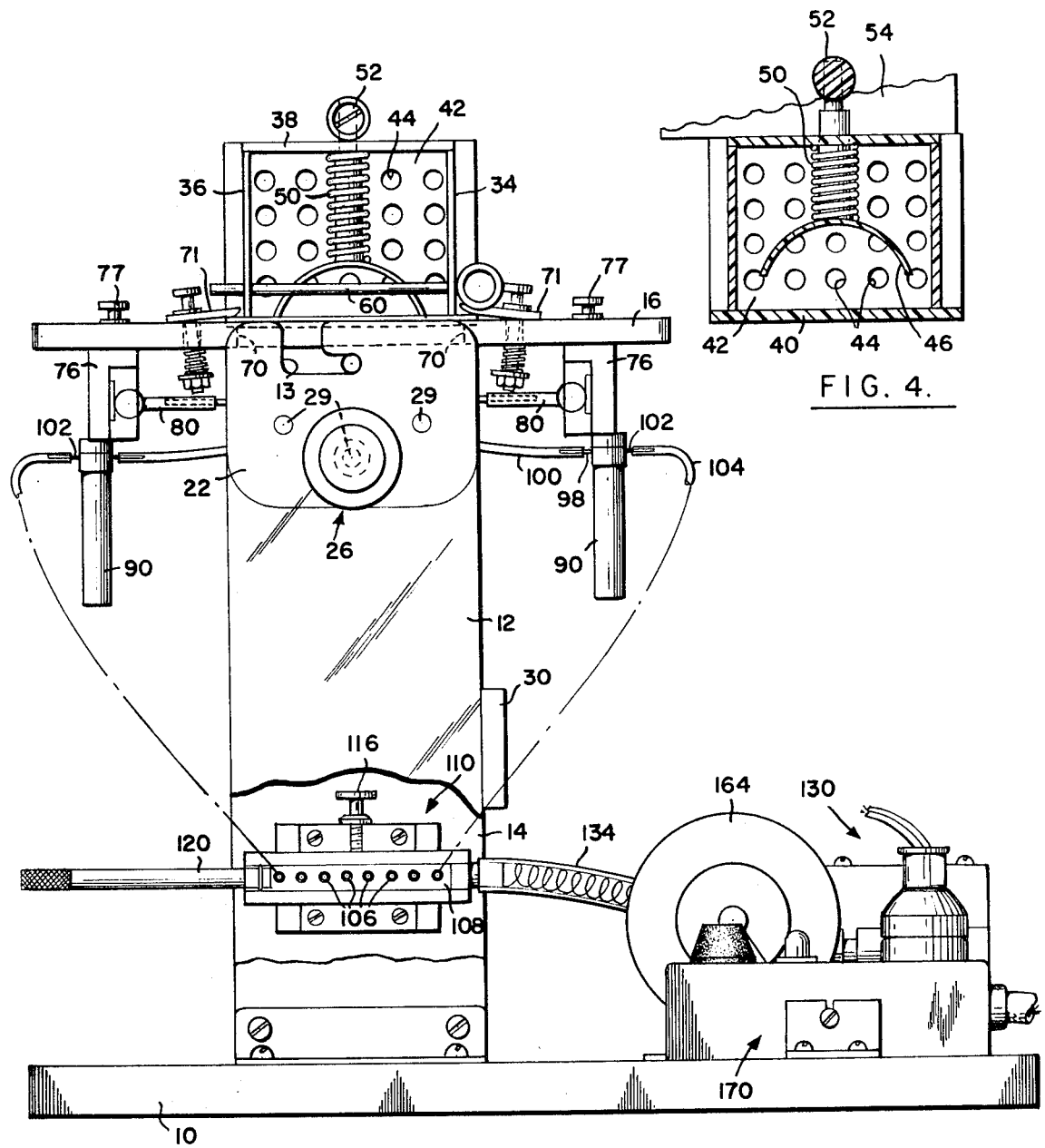

Patented May 25, 1971 3,580,220

INVENTORS
KALMAN T. SZABO
& ALLEN D. COOK
BY

ATTORNEYS

SMALL ANIMAL-MILKING APPARATUS

BACKGROUND OF THE INVENTION

The invention relates generally to the field of milking machines of the type which may be used to milk small laboratory animals, such as rats, hamsters, guinea pigs, and mice, used in various types of research.

In many types of research work the chemical analysis of the milk of a rat or the like is of considerable informational value. It was common practice to obtain milk from a lactating rat or the suckling young by killing the rat and then extracting the milk. However, the amount of milk obtained was often insufficient for proper chemical analysis and, despite extreme care, there could occur a mixing of the milk with the gastric juices of the stomach which resulted in significant alterations the milk composition. Hence, there developed a need for an effective milking machine for rats or other small laboratory animals.

SUMMARY OF THE INVENTION

In accordance with the invention, there is provided an effective milking machine adapted for use with small laboratory animals. This machine comprises a cage adapted to hold the animal in a milking position with its teats exposed, a plurality of cups adapted to receive the teats or nipples of the animal, and means for applying a pulsating suction to the cups. This suction applying means comprises a conduit means extending from a vacuum supply to the interior of the cups, and a pulsator connected in the conduit means for controlling the intermittent application of the vacuum source to the cups. There is also provided a milk-collecting container which is connected in the conduit for receiving the milk withdrawn from the cups. The milking machine in accordance with the invention can be adjusted to achieve an effective milking operation in a short period of time.

BRIEF DESCRIPTION OF THE DRAWINGS

FIG. 2 is a front elevation of the milking machine shown in FIG. 1;

FIG. 3 is a side elevation of the machine shown in FIG. 1 as viewed from the left side thereof;

FIG. 4 is a sectional view of the detail;

DESCRIPTION OF THE PREFERRED EMBODIMENT

Figure 1:
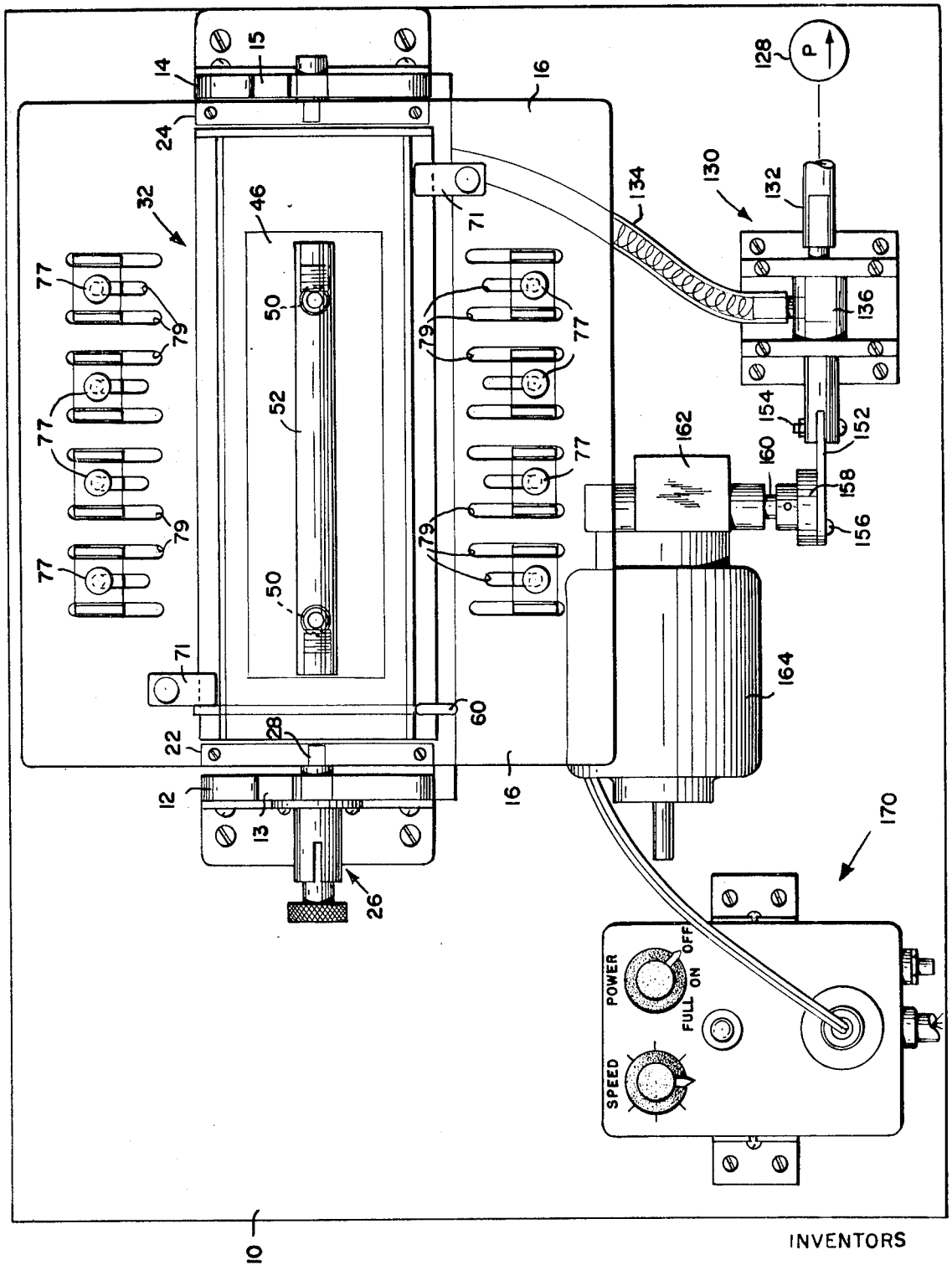
FIG. 1 is a plan view of a milking machine in accordance with the invention.

While the milking machine in accordance with the invention will be described herein as adapted for use in the milking of a rat, it will be apparent that the invention is applicable to the milking of other small laboratory animals such as hamsters, guinea pigs, and mice.

It is to be noted at the outset, that most of the parts of the milking machine are made of a substantially clear plastic. Accordingly, light lines are used in the drawings instead of dotted line showings when a part can be seen through another.

The milking machine in accordance with the invention comprises a base 10 having a pair of upright members 12 and 14 mounted thereon. At their upper ends, the members 12 and 14 pivotally support a milking table 16 by means of a pair of pivot pins 18 and 20 which are journaled in cutouts 13 and 15 in the members 12 and 14, respectively. The pins 18 and 20 extend within bores in a pair of end members 22 and 24, respectively, mounted on the bottom of the milking table 16, as by mounting screws. As best shown in FIG. 3, the cutouts 13 and 15 are shaped to facilitate the removal of the table 16 from the supporting uprights 12 and 14. There is provided a mounting pin arrangement indicated generally at 26 for use in positioning the table 16 in three positions. This is achieved by the location of a spring-biased pin 28 in the mounting mechanism 26 into either of three holes 29 in the end member 22. By this arrangement, the table can be positioned to extend horizontally or to incline in either side of the horizontal.

A cross brace 30 extends between the upright members 12 and 14 and is secured at its ends thereto as by mounting screws. The cross brace 30 serves to stiffen the frame of the machine.

There is provided a cage indicated generally at 32 for holding the rat in the milking position. The cage 32 is a generally rectangular boxlike configuration including a pair of sidewalls 34 and 36, a top wall 38 and a bottom wall 40. An end wall of the cage 32 is indicated at 42 and is provided with a plurality of airholes 44. The other end of the cage 32 is open as can be seen in FIG. 3. A rat is inserted through this open end and held in position by a spring-loaded pressure plate mechanism comprising an arcuate-shaped plate 46 extending the length of the cage 32 and mounted on a pair of rods 48 extending downwardly from the top wall 38 of the cage 32. A pair of springs 50 are mounted in compression between the underside of the top wall 38 and the top side of the plate 46 to bias the same toward the bottom of the cage 32 to a position shown in FIG. 3.

The upper ends of the rods 48 are secured to a crossbar 52 which extends across the top of the cage 32. The crossbar 52 can thus be used to raise or lower the plate 46 within the cage, an upper position of the plate 46 being indicated in FIG. 4. A pair of wedged-shaped stops 54 may be used to hold the plate 46 in its upper position such as shown in FIG. 4. The stops 54 are provided with ridges in their upper surfaces so as to frictionally engage the crossbar 52 and hold the same in a desired position. The plate 46 is moved to such an upper position when a rat is inserted within the cage after which the stops are withdrawn an amount to allow the springs to bias the plate 46 toward the rat at a desired pressure so as to hold the rat comfortably in the milking position.

When the rat is positioned within the cage its head will be adjacent to the perforated plate 42. The tail of the rat will be at the opposite end and is positioned to extend below a bar 60 which is mounted at the rear end of the cage. In this manner the rat will be prevented from retreating rearwardly out of the cage.

Figure 6:
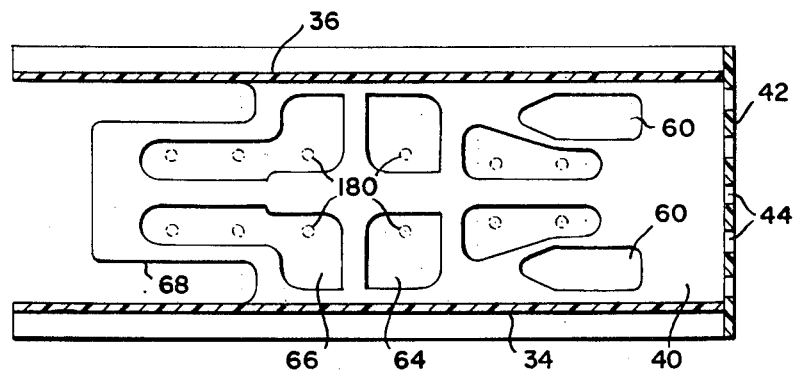
FIG. 6 is a fragmentary sectional view taken on line 6–6 of FIG. 2.

The bottom 40 of the cage is provided with a plurality of cutouts as is illustrated best in FIG. 6. There are provided five pairs of cutout portions 60, 62, 64, 66, and 68 arranged symmetrically relative to the longitudinal axis of the bottom 40. The cutouts 60 are adapted to receive the front paws of the rat while the cutouts 68 are adapted to receive the rear paws of the rat. With a rat supported on the plate 40 resting on its belly and with its front and rear paws extending within the cutouts 60 and 68, respectively, the cutouts 62 are arranged to allow the front two pairs of the rat's teats to project therethrough, the cutouts 64 are arranged to allow the one pair of the rat's teats to project therethrough, and the cutouts 66 are arranged to allow the three rear pairs of teats of the rat to project therethrough, whereby all of the rats teats are exposed from the bottom plate 40.

Means are provided for mounting the cage 32 on the top of the milking table 16 so that the bottom 40 of the cage 32 is in alignment with a rectangular opening 70 slightly smaller than the bottom 40 cage 32. Accordingly, the bottom 40 is exposed through the opening 70 to the bottom of the table 16. The mounting means for the cage 32 comprises a pair of hold down means adapted to engage edge portions of the bottom plate 40 as is best shown in FIGS. 1, 2, and 3. Each holddown means comprises a finger 71 which projects from spring-biased pins as is best shown in FIG. 3. In this manner, the cage may be readily removed from and repositioned in the position shown in the drawings. This is to facilitate insertion of a rat into the cage at a remote location after which the cage with the rat therein may be positioned on to the milking table 16.

Figure 5:
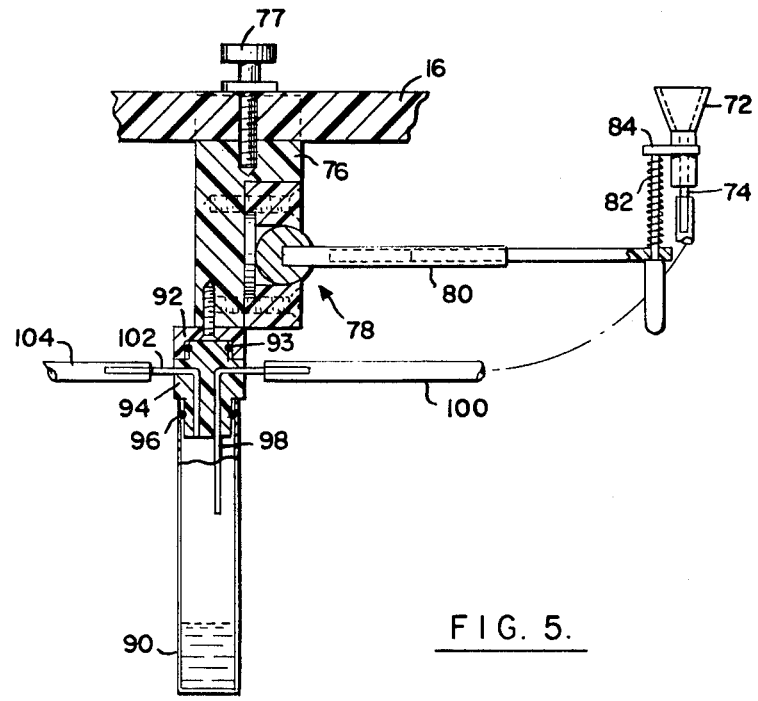
FIG. 5 is a fragmentary sectional view taken on line 5–5 of FIG. 2.

There are provided eight flexible milking cups 72 and mounting means therefor as is best illustrated in FIG. 5. Each milking cup 72 has an open end and tapers inwardly in a conicallike configuration to a cylindrical portion having a passage communicating with the interior of conical cup portion. Extending within the passage of cylindrical portion of each cup 72 is a tube 74 which communicates at one end with the interior of the conical portion thereof. The cups 72 are preferably made of a resilient material such as rubber or a resilient plastic like polyethylene or polypropylene.

Means are provided for supporting each of the cups 72, such means comprising a block members 76 supported on the bottom side of the table 16 by adjustable setscrews 77. Members 76 and screws 77 are slidable in slots 79 in table 16 toward and away from the cage 32. The member 76 carries a ball and socket mounting indicated generally at 78. A rod 80, including a pair of telescoping parts, is secured to the ball portion of the mounting 78 and projects therefrom. A pin 82 is carried on the extended end of member 80 and is provided with a claw-shaped member 84 adapted to frictionally engage the flexible cylindrical portion of the cup 72. A light spring is mounted in the compression between the claw 84 and the member 80 to provide a resilient mounting for the pin 82 and permit the same to move relative to the member 80. This serves to compensate for movement of the rat during a milking operation.

It will be apparent that the mounting means for the cup 72 permits complete freedom in the positioning of the cup 72. Thus, not only does the ball and socket mounting in combination with the telescoping rod 80 permit the positioning of the cup within a wide range of locations, but also the flexible mounting of the claws 84 permits some movement even during a milking operation.

There is provided a milk-receiving container 90 associated with each of the cups 72. Each container 90 is removably supported on the associated cup-supporting member 76 by means of a bracket 92 mounted on the member 76 by a mounting screw and by a plug member 94 which is frictionally secured at its upper end within a recessed cavity in the bracket 92 by means of a friction ring 93 mounted on an upwardly projecting portion of the plug member 94. The plug member 92 also carries at a downwardly extending portion a friction ring 96 onto which the container 90 is frictionally engaged. This mounting arrangement serves to permit removal of the container 90 for emptying the same and separation of the various parts for cleaning purposes.

Each plug member 94 carries an L-shaped tube 98 one end of which extends downwardly from the lower end thereof into a container 90 mounted thereon and the other end of which extends laterally from the plug 94. A flexible tubing 100 extends between the lateral extending end of tube 98 and the bottom end of the tube 74 to provide a conduit therebetween.

Figure 10:
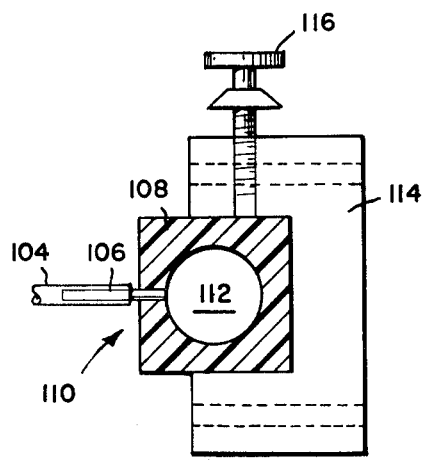
FIG. 10 is a sectional view illustrating the mounting of the valve means.
Figure 11:
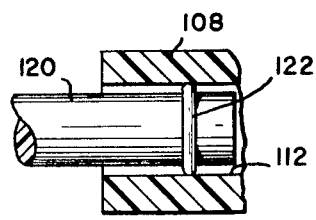
FIG. 11 is a fragmentary sectional view showing a detail of the valve means.

Each plug member 94 also has a second L-shaped tube 102 which has a downwardly extending leg which communicates with the interior of the container 90 and a laterally extending leg which projects from the plug member. Each of the laterally extending legs of the tubes 102 has a flexible tubing 104 connected thereto, such tubing extending from the tubes 102 to an associated tube 106 which is mounted in the valve body 108 of a control valve indicated generally as 110. Each of the tubes 106 extends through the valve body 108 into communication with a cylindrical valve chamber 112. The valve body 108 has a rectangular cross section as shown in FIG. 10 and is mounted in a generally rectangular cavity of a supporting bracket 114 which is secured by mounting screws to the upright member 114 in the position best shown in FIGS. 2 and 3. A setscrew 116 is used to frictionally secure the valve body 108 in position in the bracket 114. By this mounting arrangement, the valve body 108 is removable from the bracket 114.

Figure 9:
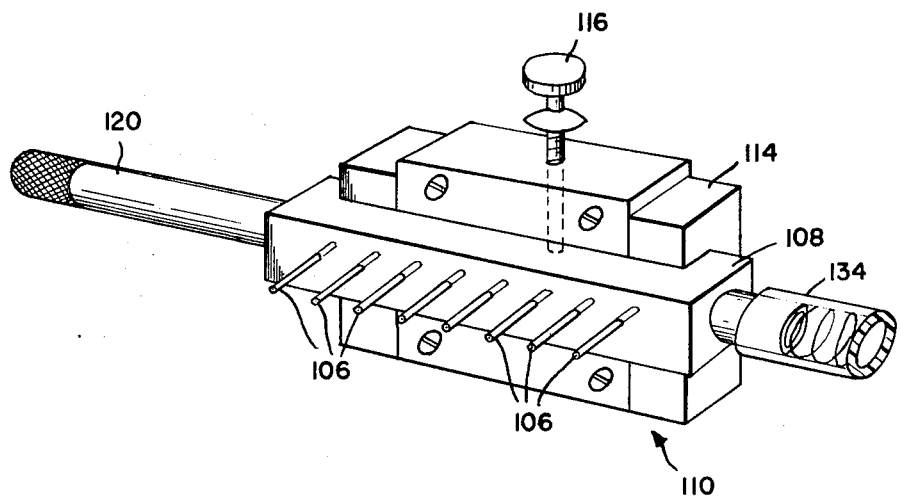
FIG. 9 is a perspective view of a valve means employed in the milking machine of FIG. 1.

A valve member in the form of an elongated rod 120 is adapted to move longitudinally within the cylindrical valve chamber 112. The valve member 120 carries a gasket 122 adjacent one end thereof adapted to contact the inner cylindrical wall of the chamber 112 to thereby effect a sealing action at the line of contact therebetween. As is shown in FIGS. 9 and 10, the tubes 106 communicate with the chamber 112 at spaced locations along the length thereof. Accordingly, by positioning the gasket 122 at a location to the right (as viewed in FIG. 9) of the point of communication of a particular tube 106 with the chamber 112 it is possible to block or close off the communication between the valve chamber 112 and any number of the tubes 106 and its associated tubing 104, container 90 and cup 72. In this manner, the control valve 110 is settable to disconnect any number of the desired cups 72 from the suction source which will be described hereafter.

Means are provided for the application of suction intermittently to the valve chamber 112. Such means comprises a suitable source of suction, such as a suction pump 128, a pulsator indicated generally at 130, a suction supply tubing 132 connecting the suction pump to the pulsator, and a suction delivery tubing 134 connecting the pulsator to the valve chamber 112 of the valve 110.

Figure 7:
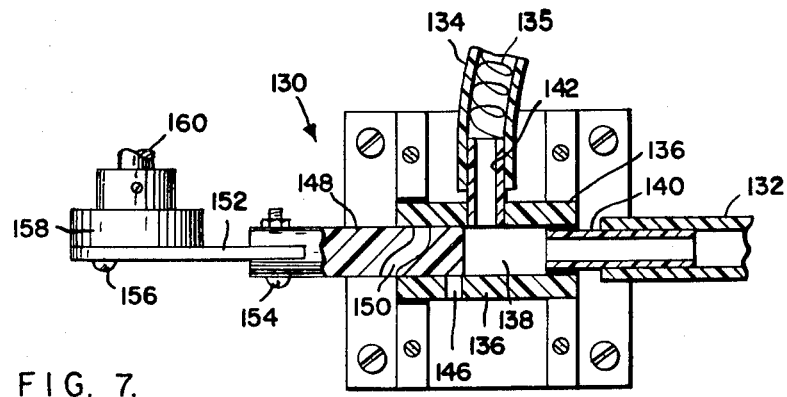
FIGS. 7 and 8 are fragmentary sectional views of the pulsator showing the same in alternate controlling positions.
Figure 8:
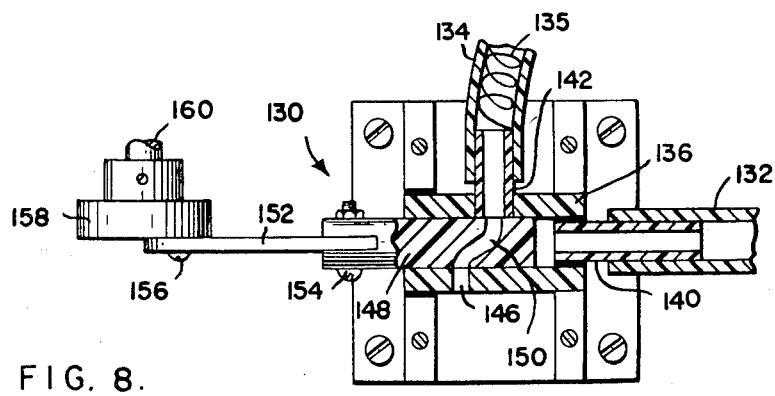

Referring to FIGS. 7 and 8, the pulsator 130 comprises a body 136 defining a cylindrical chamber 138 therein and having a suction inlet tube 140 mounted therein communicating with the chamber 138, and a suction discharge tube 142 also communicating with the chamber 138. The suction supply tubing 132 is mounted on the extended end of the tube 140 and the suction discharge tubing 134 is mounted on the suction discharge tube 142. Tubing 134 is provided with an internal helical spring which serves to prevent the collapse thereof when suction is applied to the interior thereof. The body 136 is also provided with a port 146 extending from the exterior of the body 136 to the internal wall of a cylindrical chamber 138. A cylinder member 148 is mounted within the bore forming the cylindrical chamber 138 for reciprocating movement therein.

In the position shown in FIG. 7, the cylinder member 148 is withdrawn somewhat from the chamber 138 to thereby permit flow communication between tubes 140 and 142 by way of chamber 138. In the inserted position of the cylindrical member 148 shown in FIG. 8, member 148 blocks flow communication between tubes 140 and 142 and provides flow communication between port 146 and the tube 142 by means of a passage 150 formed within the cylindrical member 148.

Means are provided for causing a reciprocating motion of the member 148 between the positions shown in FIGS. 7 and 8. Such means comprises a conventional motor-driven crank arrangement including a crank 152 having one end connected to a pin 154 at the outer end of the member 148 and the other end connected to a pin 156 secured to a rotating member 158 mounted on the end of a shaft 160. The shaft 160 is the output shaft of speed reducer 162 (FIG. 1), the input shaft of which is driven by a variable-speed motor 164. The speed of the motor 164 is adjusted by a conventional speed control means indicated generally at 170.

In the operation of the milking machine, a nursing rat is placed in the cage 32 on its belly and is held in position by the spring-loaded pressure plate 46 and the rod 60 so that the rat's nipples are exposed through the openings 62, 64, and 66 in the positions illustrated at 180 in FIG. 6. The cage 32 is mounted in a horizontal position on the horizontally extending milking table 16 by means of the holddown clamps 71. The cups 72 are then placed over the exposed nipples which will be pulled into the cups by reason of the application of a vacuum as will be described hereafter.

In order to facilitate the application of the cups 72 to the nipples, the milking table 16 may be tilted to the right or left by disengaging the member 26 from the holes 29 in the members 22 and rotating the table 16 to a desired position. Also, the mounting for the cups 72 is of the universal type and has a telescope rod 80 to thereby provide a wide range of possible positions for the cups 72.

The pulsator 130 is then set to the desired frequency of pulsations determined in accordance with the desired operation. The vacuum is also desirably set to a desired pressure.

When the pulsator is in the position shown in FIG. 7, a vacuum will be applied to the interior of the cup 72 to draw the nipple down into the cup tightly and thereby withdraw milk from the rat. The vacuum is applied from tube 132 and tube 140 to the chamber 138 and from chamber 138 through tubes 142 and tubing 134 to the valve chamber 112 from which the vacuum is directed through the tubes 106 and the tubing 104 and associated tubes 102 to the interior of the associated milk container 90. From the milk container 90 the vacuum is supplied through tube 98 and tubing 100 to the tube 74 which communicates with the interior of the cup 72.

When the pulsator moves to the position shown in FIG. 8 it will be apparent that the vacuum source is cut off and the vacuum is released from the cups 72 by the same conduit path to the pulsator described above with tube 142 in communication with port 146. When this occurs the nipple of the rat may return to its normal relaxed position.

It will be apparent that the intermittent application of a vacuum to the nipples of a rat effects a milking operation. The milk passes through tube 74 and tuning 100 and tube 98 into the container 90 where it is collected at the bottom thereof at a location spaced substantially below the lower end of tube 98.

It is noted that the vacuum can be adjusted so that the nipples of the rat are gently sucked into the cups 72 providing a constant flow of milk without causing discomfort to the rat. Also, the size of the cup 72 is designed to be large enough to provide a vacuum-type application to the mammary gland and so that the inner diameter of the cup is sufficient to allow expansion of the nipple during milking.

It is noted that in the operation of a milking machine in accordance with the invention, the milking of a rat can be completed within 5 minutes and it is possible to obtain more than 10 ml. of milk from one rat in one milking at the early stage of lactation.

It will be apparent that by the adjustment of the position of the valve member 120 any number of from one to eight of the cups 72 may be made operative. The number will depend on the amount of milk desired and the particular animal being milked.

It will be apparent that various changes may be made in the construction and arrangement of parts without departing from the scope of the invention wherefore it is not desired to be limited except as required by the following claims.

We claim:

1. A milking machine for the milking of rats or other small laboratory animals comprising a cage including body restraining means for holding the animal in a generally horizontal position, cage means supporting the belly of the animal and having openings spaced to receive the teats of the animal and expose them to the exterior of the cage, a plurality of teat cups adapted to receive the exposed teats of the rat during milking, means adjustably supporting said cups, means for supplying suction intermittently to said cups including a conduit means extending from a vacuum source to the interior of said cups, and a pulsator connected in said conduit means for controlling the alternate communication between either the vacuum source or atmosphere and said cups, and means to collect the milk passing from each of said cups.

2. A milking machine according to claim 1 including a valve means connected in said conduit means between the pulsator and said cups, said valve means being adapted to control the flow to various of said cups while blocking flow to the remainder of said cups.

3. A milking machine according to claim 1 wherein said cage belly support means includes a bottom having a plurality of pairs of cutouts to allow the nipples of the animal to extend therethrough to expose the same from the bottom of the cage.

4. A milking machine according to claim 3 wherein said cage includes an elongated plate biased downwardly from the top of the cage for contact with an animal within the cage to hold the same in a milking position.

5. A milking machine according to claim 1 wherein said conduit means includes a plurality of separate conduits associated with each of said cups, said means for collecting the milk including an individual milk container associated with each of said separate conduits.

6. A milking machine according to claim 5 including a valve connected in said conduit means between said pulsator and said separate conduits, and being arranged to control the flow to various ones of said cups and block the flow to the other of said cups.

7. A milking machine according to claim 6 wherein said valve comprises an elongated valve chamber, said conduit means including a tube connecting the discharge from said pulsator with one end of said elongated chamber, said valve including a plurality of outlet tubes associated with each of said cups and communicating with said elongated chamber at spaced locations along the length thereof, said valve also including a valve member mounted for movement along said elongated valve chamber and constructed to block flow from said valve chamber to a desired number of said outlet tubes depending on the longitudinal position of the valve member.

8. A milking machine according to claim 1 wherein said pulsator comprises means defining a valve chamber, means connecting said valve chamber to said vacuum source, means connecting said valve chamber to said cups, means for connecting said valve chamber to atmosphere, and a pulsator control member movable between a first position in which said valve chamber provides communication between said vacuum source connecting means and said cup-connecting means, and a second position in which said cup-connecting means is connected to said atmosphere-connecting means.

9. A milking machine according to claim 8 including means for reciprocating said pulsating member between said first and second positions thereof, and means for varying the rate of movement of said pulsator member between said positions thereof.

10. A milking machine according to claim 1 wherein said means for supporting said cups includes an elongated arm connected at one end to a universal type connection, said arm including a pair of telescoping members.